United States Patent [19]

Pavitt, Jr.

[11] Patent Number: 4,517,413
[45] Date of Patent: May 14, 1985

[54] TELEPHONE TRIGGERED SWITCHING SYSTEM FOR TRANSCRIBER

[76] Inventor: William H. Pavitt, Jr., 1334 Charmel Pl., Pacific Palisades, Calif. 90272

[21] Appl. No.: 573,015

[22] Filed: Jan. 23, 1984

[51] Int. Cl.³ .............................................. H04M 1/65
[52] U.S. Cl. .................. 179/81 R; 179/2 R; 179/2 A; 179/6.16; 369/25
[58] Field of Search ............... 179/81 R, 2 R, 2 A, 179/6.16, 6.17, 84 R, 27 FH, 27 FG, 89, 2 B; 369/25

[56] References Cited

U.S. PATENT DOCUMENTS 4,328,397  5/1982  Chamberlin ..................... 369/25 X Primary Examiner—Gene Z. Rubinson
Assistant Examiner—James L. Dwyer
Attorney, Agent, or Firm—Beehler, Pavitt, Siegemund, Jagger & Martella

[57] ABSTRACT

A transcriber/telephone work station system wherein the transcriber is provided with a headset having a microphone and, by switching circuitry connected to a telephone box, the ring of an incoming call effects a switching, which, on the one hand, shuts off the transcriber, and, on the other hand, simultaneously connects the microphone headset to receive the incoming telephone call and enable the wearer of the headset to answer such call and/or redirect it. Upon the termination of the call, means are provided to reverse the switching and thereby disconnect the headset from the telephone box, and reactivate the transcriber.

4 Claims, 1 Drawing Figure

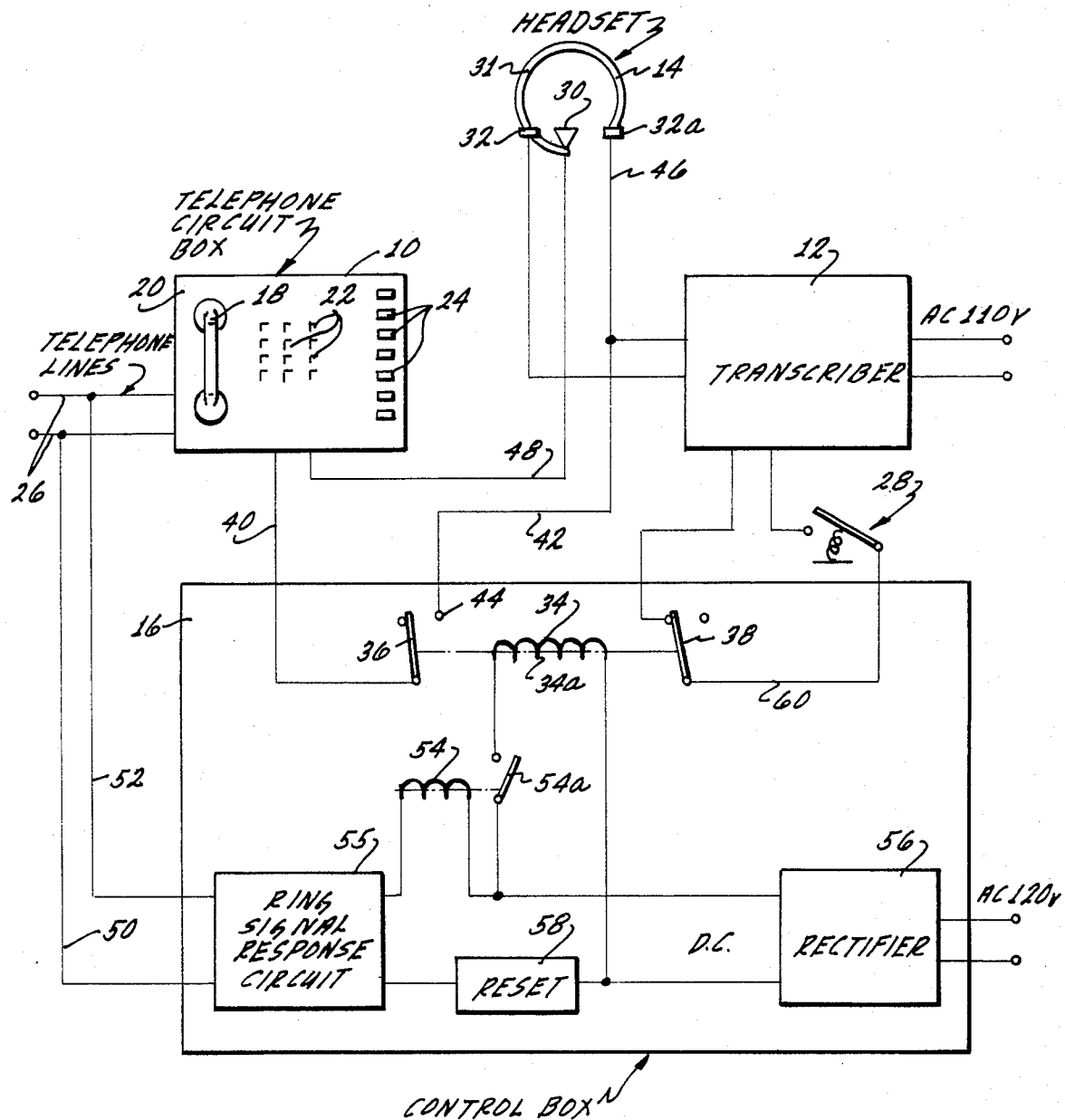

TELEPHONE TRIGGERED SWITCHING SYSTEM FOR TRANSCRIBER

FIELD OF THE INVENTION

This invention falls in the field of communication switching means having particular application to office dictation transcribers.

DESCRIPTION OF THE PRIOR ART

While great advances have taken place in recent years in devices utilized by business office personnel, and particularly secretaries and other typists, such as dictation transcribing equipment, word processors and telephone systems, little, if any, thought appears to have been given to integrating certain of these devices and systems for improving the efficiency, and enhancing the convenience, of such office personnel.

Thus, in those offices where a secretary of other typist may be called upon, not only to transcribe tape or other recorded dictation by means of a transcriber listened to by some type of headphone, and typing what is heard, either by a conventional typewriter or a word processor, but also to answer incoming telephone calls arriving at her telephone station; whenever any call does so arrive, the secretary or other typist, if then actually listening to the transcriber and typing, must stop the transcriber, remove her headphone, pick up the telephone, answer the call, direct it to the proper party in the office or take down a message on some memo pad, hang up the telephone, replace her head set, back up the transcriber and then continue her transcription typing. This procedure is not only inconvenient to the secretary or typist, but is both immediately inefficient, and conducive to the secretary's or typist's taking some more extended type of "break" in her work, simply because of the nature and extent of the interruption and the fact that she has removed her headset.

Despite such inconvenience and inefficiency, no one had heretofore sought to provide any system or equipment to obviate the same. Thus, while telephone adapters are disclosed in such recent patents as those to Chamberlin, Nos. 4,309,571 and 4,328,397, and microphone headsets are well known, as for example, in U.S. Pat. Nos. 4,039,765, and 4,052,569, none of these or any other patents has been directed to improving and conveniencing the type of secretarial operation hereinabove described.

SUMMARY OF THE INVENTION

According to the present invention, the transcriber is provided with a microphone and circuit means are provided to connect the incoming line of a telephone in such a manner that the ring signal to the telephone triggers an immediate cessation of the operation of the transcriber, and simultaneously switches the secretary's microphone headset to pick up the incoming telephone call and enable the secretary to respond to the caller. At that point, the secretary may either redirect the call through the telephone box, if included in the telephone system, to another telephone in the system, or take a message and then terminate the call. Thereupon, the secretary may switch to restart her transcriber, and thereby return to her original typing project.

It may be readily appreciated that with the system of the present invention, the secretary or other typist is considerably less inconvenienced by the telephone interruption and may efficiently handle the same and then continue with here transcription work.

DESCRIPTION OF THE DRAWING

The accompanying drawing is a schematic drawing of a system according to the invention.

DESCRIPTION OF THE INVENTION

Referring to the drawing, a system in accordance with the present invention may comprise a telephone circuit box 10, a transcriber 12, a headset 14 and control box 16, interconnected and functioning in the manner hereinafter described.

The telephone circuit box 10 desirably may be of the Western Electric type 2991 CO5 upon which a telephone 18 is removably cradled on one side 20, and which is provided with twelve dealing buttons 22 and a series of call hold, intercom, multiple line and redirecting buttons 24. Telephone lines 26 from the central station are connected to the box circuitry (not shown).

The transcriber 12 may be of any conventional type, such as, for example, a Sony MICRO DICTATION/-TRANSCRIBER BM-720, which, when operated as a transcriber may be provided with a foot switch 28, and a conventional one or two earphone headset (not shown). In lieu of the latter, the system of the present invention would substitute a headset 14 which is also provided with a microphone 30—preferably suspended from the head band 31 mounting for the earphones 32 in the manner illustrated in U.S. Pat. No. 4,039,765.

The control box 16 is connected to both the telephone circuit box 10 and the transcriber 12, and may include a relay 34 which, when energized, operates a pair of switch arms 36, 38 interposed in a line between the telephone circuit box 10 and the headset 14, in the case of arm 36, and between the transcriber 12 and its foot switch 28, in the case of arm 38.

Arm 36 is thus connected by a line 40 into the telephone circuit box 10 to pick up a connection to telephone 18 to by-pass its cradle switch (not shown), while line 42 connects the switch terminal 44 to the lead 46 from the transcriber audio (not shown) to headphone 32a. The other lead 48 connects the headset microphone 30 to the telephone circuit in such a manner as, in effect, to substitute the headset 14 for the telephone 18.

Leads 50, 52 are connected between the incoming telephone line 26 and the control box 16. The latter may be provided with a circuit 55 connected to leads 50, 52, which circuit is responsive only to the ring signal arriving via lines 26 and may serve to shift a transistor (not shown) into a conductive mode to energize a relay 54 to close a switch 54a to pass DC current from the rectifier 56 to the coil 34a of the relay 34, thereby to engage the same. The ring signal response circuit 55 which actuates the relay 54 to close the normally open switch 54a is not herein detailed since it may be devised in a manner well understood in the art, as, for example, as illustrated in U.S. Pat. No. 3,647,983.

The reset button 58 is provided to shift the transistor mentioned above back to its non-conductive mode, and thereby return the switch 54 back to its normally open position. However, it would also be possible to include a circuit (not shown), which is responsive to the termination of the call, as manifested by a change in current in lines 40, 48 to de-energize the coil 54 holding closed the switch 54a, whereupon the latter would open the circuit supplying current to the relay 34 and cause the switches 36, 38 to shift back to their respective first and normal positions to open the connection of the headset 14 to the telephone circuit box 10, and close the transcriber footswitch line 60 to enable the transcriber again to become operative.

In operation, it is contemplated that, while a secretary may be engaged in transcribing dictation, a call arrives through the telephone lines 26, being preceded by the customary ring signal. Heretofore, when the secretary hears the telephone ring, it has been necessary for her to remove her head set, stop her transcriber and pick up the telephone from its circuit box and answer it. However, with the present invention, it may be seen that as soon as the ring signal arrives via the lines 26, the control box circuitry produces an energization of the relay 34 to shift the switches 36 and 38 from their first and normal positions, to their second respective positions. The effect of such shifting is, in the case of switch 38, immediately to terminate further movement of the transcriber by opening the line of the foot switch 28, and simultaneously, in the case of switch 36, to complete connection of the telephone circuitry in the box 10 to the microphone/headset 14 in such a manner that the caller is placed in immediate oral communication with the wearer of the headset 14. Thereby, the person engaged in the transcribing work may answer the call, take any message, or redirect the call through appropriate buttons 23 on the telephone circuit box 10 to another telephone station without having to remove her headset, pick up the telephone, answer the call and respond, replace the telephone, and put the headset back on her head.

Resumption of transcription work with the present invention may be accomplished either by pressing the manual reset button 58 on the control box 16, or if the reset circuitry is included as described above, the resetting will be accomplished automatically upon the termination of the call.

The present invention thus enables a secretary or other typist engaged in tape transcription to operate most efficiently and without the irritation of having to remove her headset to answer telephone calls.

I claim:

1. A transcriber/telephone work station system, said system including:
   (a) a telephone station box having an incoming line, circuitry connected thereto, and a telephone connected to said circuitry;
   (b) a transcriber, said transcriber including on-off switching means, electronic means to convert electromagnetically recorded dictation to audio frequency output, and socket means to receive a headset plug through which the audio frequency output may be delivered to a headset for listening by a person utilizing the transcriber;
   (c) a headset, said headset having at least one earphone and means to plug into said socket means to convey said audio frequency output to said earphone, and a microphone in circuit with said earphone and disposed for voice reception from the wearer of the headset;
   (d) telephone signal actuated switching means, the last said means comprising: double acting switching means, the first switch of said switching means being connected between the telephone circuitry and the microphone/earphone circuit of said headset, and the second switch of said double acting switching means being interposed in the line of said on-off switching means, said double acting switching means, in its first and normal position, having its said first switch open and its second switch closed, and in its second position, its first switch closed and its second switch open; and means connected to said incoming telephone line and responsive to the ring signal arriving therethrough, to shift said double acting switching means from its first position to its second position and releaseably held in its second position, whereby said transcriber becomes turned off, and the telephone circuitry is connected to the microphone/earphone circuit of said headset to enable the person at the transcriber/telephone work station to receive the call arriving through said circuitry and indicated by said ring signal, and to converse with the caller; and means to reset said double acting switching means to its first position.

2. A transcriber/telephone work station system, said system including:
   (a) a telephone station box having an incoming line, circuitry connected thereto, and a telephone connected to said circuitry, said circuitry including at least one outgoing line to another telephone station and switching means to direct calls received via said incoming line to said outgoing line;
   (b) a transcriber, said transcriber including on-off switching means, electronic means to convert electromagnetically recorded dictation to audio frequency output, said socket means to receive a headset plug through which the audio frequency output may be delivered to a headset for listening by a person utilizing the transcriber;
   (c) a headset, said headset having at least one earphone and means to plug into said socket means to convey said audio frequency output to said earphone, and a microphone in circuit with said earphone and disposed for voice reception from the wearer of the headset;
   (d) a telephone signal actuated switching means, the last said means comprising: double acting switching means, the first switch of said switching means being connected between the telephone circuitry and the microphone/earphone circuit of said headset, and the second switch of said double acting switching means being interposed in the line of said on-off switching means, said double acting switching means, in its first and normal position, having its said first switch open and its second switch closed, and in its second position, its first switch closed and its second switch open; and means connected to said incoming telephone line and responsive to the ring signal arriving therethrough, to shift said double acting switching means from its first position to its second position, and releasably held in its said second position, whereby said transcriber becomes turned off, and the telephone circuitry is connected to the microphone-earphone circuit of said headset to enable the person at the transcriber/telephone work station to receive the call arriving through said circuitry and indicated by said ring signal, to converse with the caller and to redirect the call to said other telephone, and means to reset said double acting switching means to its first position.

3. A transcriber/telephone work station system, said system including:

(a) a telephone station box having an incoming line, circuitry connected thereto, and a telephone connected to said circuitry;

(b) a transcriber, said transcriber including a foot operated on-off switching means, electronic means to convert electromagnetically recorded dictation to audio frequency output, and socket means to receive a headset plug through which the audio frequency output may be delivered to a headset for listening by a person utilizing the transcriber;

(c) a headset, said headset having at least one earphone and means to plug into said socket means to convey said audio frequency output to said earphone, and a microphone in circuit with said earphone and disposed for voice reception from the wearer of the headset;

(d) telephone signal actuated switching means, the last said means comprising: double acting switching means, the first switch of said switching means being connected between the telephone circuitry and the microphone/earphone circuit of said headset, and the second switch of said double acting switching means being interposed in the line of said on-off switching means, said switching means, in its first and normal position, having its said first switch closed and its second switch open, and means connected to said incoming telephone line and responsive to the ring signal arriving therethrough, to shift said double acting switching means from its first position to its second position and releaseably hold it in said second position, whereby said transcriber becomes turned off, and the telephone circuitry is connected to the microphone/earphone circuit of said headset to enable the person at the transcriber/telephone work station to receive the call arriving through said circuitry and indicated by said ring signal, and to converse with the caller; and (e) manual reset switching means, said means including a device which, when pushed, releases the hold on said double acting switching means, thereby causing the latter to switch back from its second position to its first and normal position.

4. The system as described in claim 1 wherein said reset switching means comprises further circuitry connected to said incoming telephone line and responsive to the termination of the telephone call, the ring of which caused said double acting switching means to shift from its first position to its second position, said reset switching means, upon detecting the termination of said call, thereupon releasing the hold of the double acting switching means in its second position, to cause it to return to its first and normal position.

* * * * *